United States Patent
Kinoshita et al.

(10) Patent No.: US 8,829,827 B2
(45) Date of Patent: Sep. 9, 2014

(54) METHODS, SYSTEMS AND APPARATUS FOR CONTROLLING OPERATION OF AN ELECTRIC MACHINE IN AN OVERMODULATION REGION

(75) Inventors: Michael H. Kinoshita, Redondo Beach, CA (US); Milun Perisic, Torrance, CA (US); Gabriel Gallegos-Lopez, Lomita, CA (US); Ray M. Ransom, Big Bear City, CA (US)

(73) Assignee: GM Global Technology Operations, LLC, Detroit, MI (US)

( * ) Notice: Subject to any disclaimer, the term of this patent is extended or adjusted under 35 U.S.C. 154(b) by 316 days.

(21) Appl. No.: 13/339,256

(22) Filed: Dec. 28, 2011

(65) Prior Publication Data

US 2013/0169201 A1 Jul. 4, 2013

(51) Int. Cl.
H02P 21/00 (2006.01)
H02P 27/08 (2006.01)

(52) U.S. Cl.
CPC .................................... H02P 27/085 (2013.01)
USPC .................. 318/400.02; 318/400.01; 318/700

(58) Field of Classification Search
CPC ........................... H02P 27/085; H02P 21/0089
USPC ................................ 318/400.02, 400.01, 700
See application file for complete search history.

(56) References Cited

U.S. PATENT DOCUMENTS

| | | | |
|---|---|---|---|
| 6,861,813 B2 * | 3/2005 | Yoshimoto et al. | 318/432 |
| 7,642,737 B2 * | 1/2010 | Bae et al. | 318/400.02 |
| 7,960,930 B2 * | 6/2011 | Sato | 318/432 |
| 2011/0221367 A1 | 9/2011 | Perisic et al. | |

OTHER PUBLICATIONS

Modi, Manoj Kumar, et al., Analysis of Overmodulation in Sine-Triangle PWM from a Space Vector Perspective, 2010, pp. 1-7, Department of Electrical Engineering, Indian Institute of Science Bangalore, Karnataka.
Khambadkone, A.M., et al., A General Space Vector PWM Algorithm for a Multilevel Inverter Including Operation in Overmodulation Range, with a Detailed Modulation Analysis for a 3-level NPC Inverter, IEEE, 2005, pp. 2527-2533.
Lee, Dong-Choon, et al., A Novel Overmodulation Technique for Space-Vector PWM Inverters, IEEE Transactions on Power Electronics, vol. 13, No. 6, Nov. 1998, pp. 1144-1151.
Holtz, Joachim, et al., On Continuous Control of PWM Inverter in the Overmodulation Range Including the Six Step Mode, IEEE Transactions on Power Electronics, vol. 8, No. 4, Oct. 1993, pp. 546-553.
Ryu, Hyung-Min, et al., Analysis of Multiphase Space Vector Pulse-Width Modulation Based on Multiple d—q Spaces Concept, IEEE Transactions on Power Electronics, vol. 20, No. 6, Nov. 2005, pp. 1364-1371.

* cited by examiner

*Primary Examiner* — David Luo
(74) *Attorney, Agent, or Firm* — Ingrassia Fisher & Lorenz, P.C.

(57) ABSTRACT

Embodiments of the present disclosure relate to methods, systems and apparatus for controlling operation of an electric machine in a vector controlled motor drive system when the electric machine operates in an overmodulation region. The disclosed embodiments can reduce variations/errors in the phase voltage command signals applied to the multi-phase machine so that phase current may be properly regulated thus reducing current/torque oscillation, which can in turn improve machine efficiency and performance, as well as utilization of the DC voltage source.

17 Claims, 10 Drawing Sheets

METHODS, SYSTEMS AND APPARATUS FOR CONTROLLING OPERATION OF AN ELECTRIC MACHINE IN AN OVERMODULATION REGION

STATEMENT REGARDING FEDERALLY SPONSORED RESEARCH OR DEVELOPMENT

The disclosed embodiments were made with Government support under GAF1-DPN-DE-FC26-07NT43123, awarded by the US-Department of Energy. The Government has certain rights in this application and patents issuing therefrom.

TECHNICAL FIELD

The technical field generally relates to techniques for controlling operation of multi-phase systems, and more particularly relate to methods, systems and apparatus used to control a multi-phase electric machine.

BACKGROUND

Electric machines are utilized in a wide variety of applications. For example, hybrid/electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. Some traditional HEVs implement two three-phase pulse width modulated (PWM) inverter modules and two three-phase AC machines (e.g., AC motors) each being driven by a corresponding one of the three-phase PWM inverter modules that it is coupled to. In some systems, voltage command signals are applied to a pulse width modulation (PWM) module. The PWM module applies PWM waveforms to the phase voltage command signals to control pulse width modulation of the phase voltage command signals and generate switching vector signals that are provided to the PWM inverter module.

Many modern high performance AC motor drives use the principle of field oriented control (FOC) or "vector" control to control operation of the AC electric motor. In particular, vector control is often used in variable frequency drives to control the torque applied to the shaft (and thus the speed) of an AC electric motor by controlling the current fed to the AC electric motor. In short, stator phase currents are measured and converted into a corresponding complex space vector. This current vector is then transformed to a coordinate system rotating with the rotor of the AC electric motor.

Recently, researchers have used multi-phase machines in various applications including electric vehicles. As used herein, the term "multi-phase" refers to two or more phases, and can be used to refer to electric machines that have two or more phases. A multi-phase electric machine typically includes a multi-phase PWM inverter module that drives one or more multi-phase AC machine(s). One example of such a multi-phase electric machine is a three-phase AC machine. In a three-phase system, a three-phase PWM inverter module drives one or more three-phase AC machine(s).

In such multi-phase systems, voltage command signals are applied to a pulse width modulation (PWM) module. To control pulse width modulation of the voltage command signals, the PWM module applies PWM waveforms. The PWM waveforms that have a controllable duty cycle with a variable PWM period, to the voltage command signals to generate switching vector signals that are provided to the PWM inverter module. A modulation index, which is defined as a normalized fundamental reference voltage, can be used to characterize performance of the PWM. The modulation index is the ratio of the peak fundamental phase voltage (Vr) to the maximum available voltage. In a three-phase system, three important modulation regions can be defined in terms of their modulation index. The regions are defined as a linear modulation region, a first overmodulation region, and a second overmodulation region. For a three-phase machine operating in the linear modulation region, the modulation index ranges between zero and 0.9069 as described in expression (1A) as follows:

$$MI \in \left[0, \frac{\pi}{2\sqrt{3}}\right] = [0, 0.9069]. \tag{1A}$$

Similarly, for a five-phase machine, the linear modulation region the modulation index ranges between zero and 0.9669 as described in expression (1B) as follows:

$$MI \in \left[0, \frac{\pi\sqrt{5+2\sqrt{5}}}{10}\right] = [0, 0.9669]. \tag{1B}$$

For a three-phase machine operating in the first overmodulation region the modulation index ranges between 0.9069 and 0.9514 as described in expression (2A) as follows:

$$MI \in \left[\frac{\pi}{2\sqrt{3}}, \frac{\sqrt{3}}{2}\ln 3\right] = [0.9069, 0.9514]. \tag{2A}$$

Similarly, for a five-phase machine operating in the first overmodulation region, the modulation index ranges between 0.9669 and 0.9832 as described in expression (2B) as follows:

$$MI \in \frac{\pi\sqrt{5+2\sqrt{5}}}{10}\left[1, \frac{5}{\pi}\ln\left(\frac{2+\sqrt{5}}{\sqrt{5}}\right)\right] = [0.9699, 0.9832]. \tag{2B}$$

For a three-phase machine operating in the second overmodulation region the modulation index ranges between 0.9514 and 1.0000 as described in expression (3A) as follows:

$$MI \in [0.9514, 1] \tag{3A}$$

Similarly, for a five-phase machine operating in the second overmodulation region, the modulation index ranges between 0.9832 and 1.0000 as described in expression (3B) as follows:

$$MI \in [0.9832, 1] \tag{3B}$$

When the multi-phase machine is operating at between medium to high speed, this operating mode is commonly referred to as being in either a first overmodulation region or second overmodulation region. Performance of inverter modules in the second overmodulation region could be limited by hard limit of modulation index to less than 100%. As a consequence, the stator voltages that can be generated are less than 100% of the maximum available voltage, and the maximum torque that can be generated is therefore also less than 100%.

To address this issue, overmodulation methods have been developed for modifying the stationary reference frame voltage command signals. However, existing methods used to generate these modified voltage command signals can generate a discontinuity when the system operates in an overmodulation region. This can be seen in the stationary reference frame β-axis voltage command signal (Vβ**), and eventually results in an asymmetric duty cycles for the phase voltage command signals (Vbs*, Vcs*) for phases B and C. As a result, the wrong phase voltages are applied to phase B and C, which negatively affects control of the current regulator and field-weakening loop. For example, if the wrong phase voltage is applied to the machine, phase current may not be properly regulated, which may in turn cause current/torque oscillations.

It would be desirable to provide a mechanism for ensuring that the correct phase voltages are generated and applied to a multi-phase machine to help maintain proper phase current regulation when operating in the overmodulation region(s). Other desirable features and characteristics of the present invention will become apparent from the subsequent detailed description and the appended claims, taken in conjunction with the accompanying drawings and the foregoing technical field and background.

SUMMARY

Embodiments of the present disclosure relate to methods, systems and apparatus for controlling operation of an electric machine in a vector controlled motor drive system that includes an inverter module that drives the electric machine when the electric machine operates in an overmodulation region.

In accordance with some of the disclosed embodiments, an overmodulation method is provided for controlling an electric machine, such as a multi-phase electric machine that is operating in an overmodulation region. When unmodified voltage command signals are received, a modified voltage angle can be generated without computing a sector number of the unmodified voltage command signals. Based on the modified voltage angle, modified voltage command signals are generated that can be used when the electric machine is operating in the overmodulation region.

In accordance with some of the other disclosed embodiments, an overmodulation processor is provided that is configured to generate modified voltage command signals for controlling an electric machine when the electric machine is operating in an overmodulation region. The overmodulation processor comprises a voltage angle computation function, a voltage angle modification unit, and a modified voltage command generation module. The voltage angle computation function can receive a pair of unmodified voltage command signals and to compute an arctangent of a ratio of the pair of unmodified voltage command signals to generate an actual voltage angle. The voltage angle modification unit can generate a modified voltage angle based on a hold angle and the actual voltage angle without computing a sector number of the pair of unmodified voltage command signals. The modified voltage command generation module can generate, based on the modified voltage angle, a pair of modified voltage command signals.

In accordance with some of the other disclosed embodiments, a vector controlled motor drive system is provided for controlling an electric machine. The vector controlled motor drive system includes an overmodulation processor and a voltage command selection module. The overmodulation processor receives unmodified voltage command signals and a hold angle, and uses these inputs to generate a modified voltage angle without computing a sector number of the unmodified voltage command signals. The overmodulation processor can then generate modified voltage command signals based on the modified voltage angle. The modified voltage command signals can be used to control the electric machine when the system is operating in an overmodulation region. Depending on the value of the hold angle, the voltage command selection module can output either the unmodified voltage command signals, or the modified voltage command signals.

The disclosed embodiments can provide a mechanism for generating voltage command signals so that correct phase voltage command signals can be generated and eventually applied to the electric machine. The mechanism for generating the voltage command signals can reduce variations/errors in the phase voltage command signals that are applied to the electric machine so that phase current may be properly regulated thus reducing current/torque oscillation, which can in turn improve machine efficiency and performance, as well as utilization of the DC voltage source.

DESCRIPTION OF THE DRAWINGS

Embodiments of the present disclosure will hereinafter be described in conjunction with the following drawing figures, wherein like numerals denote like elements.

DESCRIPTION OF EXEMPLARY EMBODIMENTS

Figure 1A:
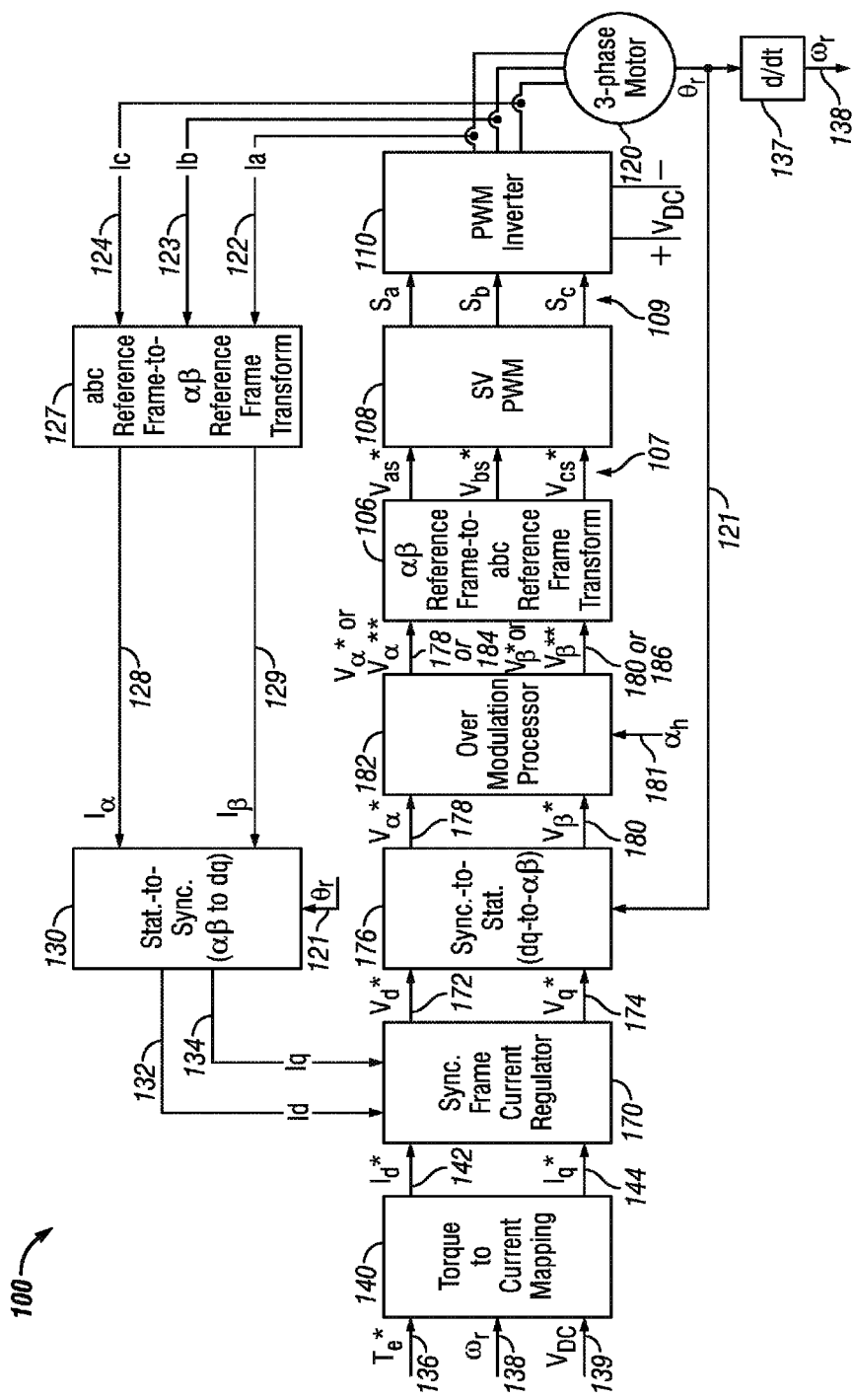
FIG. 1A is a block diagram of one example of a vector controlled motor drive system in accordance with some of the disclosed embodiments.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to controlling operation of a multi-phase system. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling operation of a multi-phase system, as described herein. As such, these functions may be interpreted as steps of a method for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present invention relate to methods, systems and apparatus for controlling operation of a multi-phase system when the multi-phase machine is operating in its overmodulation region. In one exemplary implementation, the multi-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system when the multi-phase machine is operating in its overmodulation region. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous.

FIG. 1A is a block diagram of one example of a vector controlled motor drive system 100 in accordance with the disclosed embodiments. The system 100 controls a three-phase AC machine 120 via a three-phase pulse width modulated (PWM) inverter module 110 coupled to the three-phase AC machine 120 so that the three-phase AC machine 120 can efficiently use a DC input voltage (Vdc) 139 provided to the three-phase PWM inverter module 110 by adjusting current commands that control the three-phase AC machine 120. In one particular implementation, the vector controlled motor drive system 100 can be used to control torque in an HEV.

In the following description of one particular non-limiting implementation, the three-phase AC machine 120 is embodied as a three-phase AC powered motor 120, and in particular a three-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multi-phase AC machine that includes fewer or more phases.

The three-phase AC motor 120 is coupled to the three-phase PWM inverter module 110 via three inverter poles and generates mechanical power (Torque×Speed) based on three-phase sinusoidal current signals 122 ... 124 received from the PWM inverter module 110. In some implementations, the angular position 121 of a rotor (θr) of the three-phase AC motor 120 or "shaft position" is measured using a position sensor (not illustrated), and in other implementations, the angular position 121 of a rotor (θr) of the three-phase AC motor 120 can be estimated without using a position sensor by using sensorless position estimation techniques.

Figure 1B:
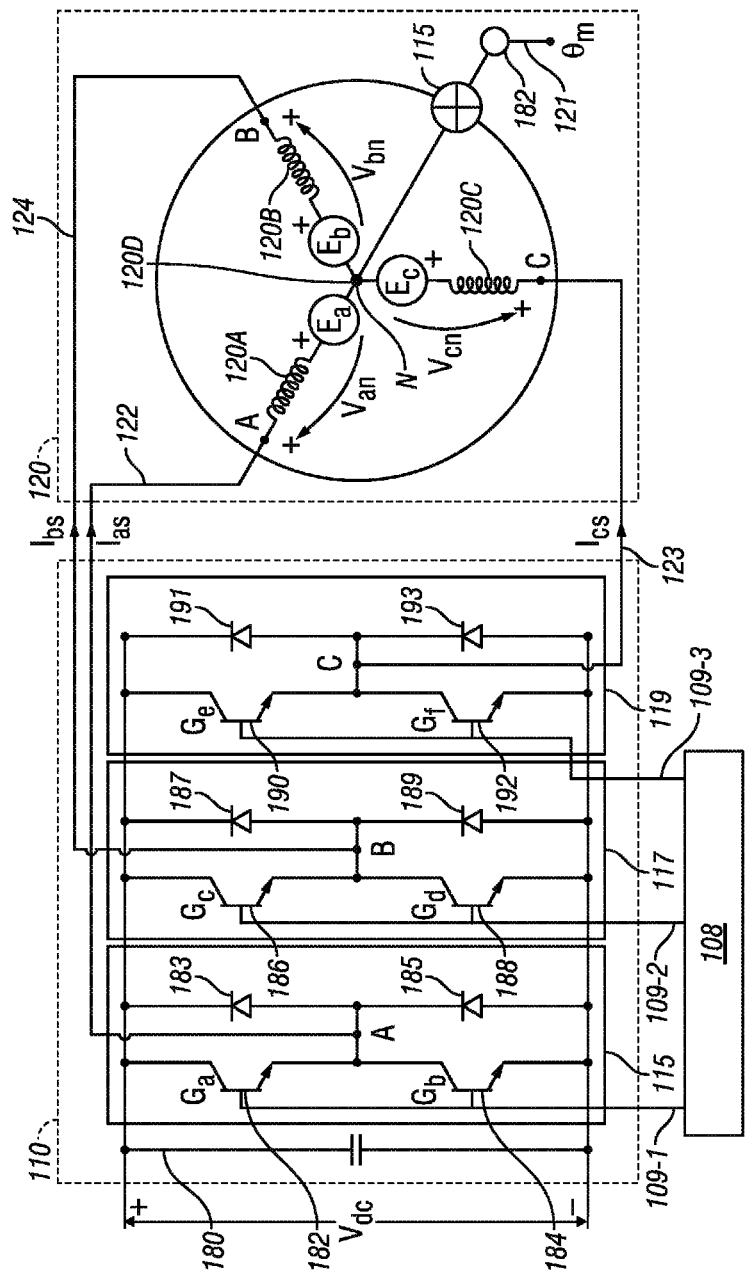
FIG. 1B is a block diagram of a portion of a motor drive system including a three-phase voltage source inverter module connected to a three-phase AC motor.

Prior to describing operation details of the system 100, a more detailed description of one exemplary implementation of the three-phase voltage source inverter 110 will be provided (including how it is connected to the three-phase AC motor 120) with reference to FIG. 1B.

FIG. 1B is a block diagram of a portion of a motor drive system including a three-phase voltage source inverter 110 connected to a three-phase AC motor 120. It should be noted that the three-phase voltage source inverter 110 and the three-phase motor 120 in FIG. 1A are not limited to this implementation; rather, FIG. 1B is merely one example of how the three-phase voltage source inverter 110 and the three-phase motor 120 in FIG. 1A could be implemented in one particular embodiment.

As illustrated in FIG. 1B, the three-phase AC motor 120 has three stator or motor windings 120A, 120B, 120C, connected to motor terminals A, B, C, and the three-phase PWM inverter module 110 includes a capacitor (not shown) and three inverter sub-modules 115, 117, 119. In this particular embodiment, in phase A the inverter sub-module 117 is coupled to motor winding 120a, in phase B the inverter sub-module 116 is coupled to motor winding 120b, and in phase C the inverter sub-module 119 is coupled to motor winding 120c. The current into motor winding A 120a flows out motor windings B, C 120b-120c, the current into motor winding B 120b flows out motor windings A and C, 120a, 120c, and the current into motor winding C 120c flows out motor windings A and B, 120a, 120b.

The resultant phase or stator currents (Ia-Ic) 122, 123, 124, flow through respective stator windings 120a-c. The phase to neutral voltages across each of the stator windings 120a-120c are respectively designated as $V_{AN}$, $V_{BN}$, $V_{CN}$, with the back electromotive force (EMF) voltages generated in each of the stator windings 120a-120c respectively shown as the voltages $E_a$, $E_b$, $E_c$, produced by ideal voltage sources, each respectively shown connected in series with stator windings 120a-120c. As is well known, these back EMF voltages $E_a$, $E_b$, $E_c$, are the voltages induced in the respective stator windings 120a-120c by the rotation of the permanent magnet rotor. Although not shown, the motor 120 can be coupled to a drive shaft.

The inverter 110 includes a capacitor 170, a first inverter sub-module 115 comprising a dual switch 182/183, 184/185, a second inverter sub-module 117 comprising a dual switch 186/187, 188/189, and a third inverter sub-module 119 comprising a dual switch 190/191, 192/193. As such, inverter 110 has six solid state controllable switching devices 182, 184, 186, 188, 190, 192, and six diodes 183, 185, 187, 189, 191, 193, to appropriately switch compound voltage ($V_{DC}$) and provide three-phase energization of the stator windings 120a, 120b, 120c of the three-phase AC motor 120.

A closed loop motor controller 108 can receive motor command signals and motor operating signals from the motor 120, and generate control signals 109 for controlling the switching of solid state switching devices 182, 184, 186, 188, 190, 192 within the inverter sub-modules 115, 117, 119. By providing appropriate control signals 109-1 . . . 109-3 to the individual inverter sub-modules 115, 117, 119, the closed loop motor controller 108 controls switching of solid state switching devices 182, 184, 186, 188, 190, 192, within the inverter sub-modules 115, 117, 119 and thereby controls the outputs of the inverter sub-modules 115, 117, 119 that are provided to motor windings 120a-120c, respectively. The resultant stator currents (Ia . . . Ic) 122-124 that are generated by the inverter sub-modules 115, 117, 119 of the three-phase inverter module 110 are provided to motor windings 120a, 120b, 120c. The voltages as $V_{AN}$, $V_{BN}$, $V_{CN}$, and the voltage at node N (120D) fluctuate over time depending on the open/close states of switches 182, 184, 186, 188, 190, 192 in the inverter sub-modules 115, 117, 119 of the inverter module 110, as will be described below.

Referring again to FIG. 1A, the vector control motor drive system 100 includes a torque-to-current mapping module 140, a synchronous (SYNC.) frame current regulator module 170, a synchronous-to-stationary (SYNC.-TO-STAT.) transformation module 176, an overmodulation processor 182, an αβ reference frame-to-abc reference frame (αβ-to-abc) transformation module 106, a pulse width modulation (PWM) module 108, a three-phase PWM inverter 110, an abc reference frame-to-αβ reference frame (abc-to-αβ) transformation module 127, and a stationary-to-synchronous (STAT.-TO-SYNC.) transformation module 130.

The torque-to-current mapping module 140 receives a torque command signal (Te*) 136, angular rotation speed (ωr) 138 of the shaft that is generated at block 137 based on the derivative of the rotor/shaft position output (θr) 121, and the DC input voltage ($V_{DC}$) 139 as inputs, along with possibly a variety of other system parameters depending upon implementation. The torque-to-current mapping module 140 uses these inputs to generate a d-axis current command (Id*) 142 and a q-axis current command (Iq*) 144 that will cause the motor 120 to generate the commanded torque (Te*) at speed (ωr) 138. In particular, the torque-to-current mapping module 140 uses the inputs to map the torque command signal (Te*) 136 to a d-axis current command signal (Id*) 142 and a q-axis current command signal (Iq*) 144. The synchronous reference frame d-axis and q-axis current command signals (Id*, Iq*) 142, 144 are DC commands that have a constant value as a function of time.

The abc-to-αβ transformation module 127 receives the measured three-phase stationary reference frame feedback stator currents (Ia . . . Ic) 122-124 that are fedback from motor 120. The abc-to-αβ transformation module 127 uses these three-phase stationary reference frame feedback stator currents 122-124 to perform an abc reference frame-to-αβ reference frame transformation to transform the three-phase stationary reference frame feedback stator currents 122-124 into stationary reference frame feedback stator currents (Iα, Iβ) 128, 129. The abc-to-αβ transformation is well-known in the art and for sake of brevity will not be described in detail.

The stationary-to-synchronous transformation module 130 receives the stationary reference frame feedback stator currents (Iα, Iβ) 128, 129 and the rotor angular position (θr) 121 and generates (e.g., processes or converts) these stationary reference frame feedback stator currents (Iα, Iβ) 128, 129 to generate a synchronous reference frame d-axis current signal (Id) 132 and a synchronous reference frame q-axis current signal (Iq) 134. The process of stationary-to-synchronous conversion is well-known in the art and for sake of brevity will not be described in detail.

The synchronous frame current regulator module 170 receives the synchronous reference frame d-axis current signal (Id) 132, the synchronous reference frame q-axis current signal (Iq) 134, the d-axis current command (Id*) 142 and the q-axis current command (Iq*) 144, and uses these signals to generate a synchronous reference frame d-axis voltage command signal (Vd*) 172 and a synchronous reference frame q-axis voltage command signal (Vq*) 174. The synchronous reference frame voltage command signals (Vd*, Vq*) 172, 174 are DC commands that have a constant value as a function of time for steady state operation. The process of current to voltage conversion can be implemented as a Proportional-Integral (PI) controller, which is known in the art and for sake of brevity will not be described in detail. Because the current commands are DC signals in the synchronous reference frame they are easier to regulate in comparison to AC stationary reference frame current commands.

The synchronous-to-stationary transformation module 176 receives the synchronous reference frame d-axis voltage command signal (Vd*) 172 and the synchronous reference frame q-axis voltage command signal (Vq*) 174 as inputs along with the rotor position output (θr) 121, and performs a dq-to-αβ transformation to generate an α-axis stationary reference frame voltage command signal (Vα*) 178 and a β-axis stationary reference frame voltage command signal (Vβ*) 180. The stationary reference frame α-axis and β-axis voltage command signals (Vα*, Vβ*) 178, 180 are in the stationary reference frame and therefore have values that vary as a sine wave as a function of time. The process of synchronous-to-stationary conversion is well-known in the art and for sake of brevity will not be described in detail.

In accordance with the disclosed embodiments, the overmodulation processor 182 receives the stationary reference frame α-axis and β-axis voltage command signals (Vα*, Vβ*) 178, 180 and a hold angle ($α_h$) 181, and outputs either the stationary reference frame α-axis and β-axis voltage command signals (Vα*, Vβ*) 178, 180, or modified stationary reference frame α-axis and β-axis voltage command signals (Vα, Vβ) 184, 186, depending on the value of the hold angle ($α_h$) 181.

To explain further, when the system 100 is operating in a linear region, the overmodulation processor 182 passes the stationary reference frame α-axis and β-axis voltage command signals (Vα*, Vβ*) 178, 180 to the αβ-to-abc transformation module 106 without modifying them.

However, when the system 100 is operating in an overmodulation region, the overmodulation processor 182 further processes these voltage command signals 178, 180 to generate a modified stationary reference frame α-axis and β-axis voltage command signals (Vα, Vβ) 184, 186 that are optimized such that output voltage signals generated by the inverter module 110 can be increased via overmodulation. The modified voltage command signals (Vα, Vβ) 184, 186 can be used to control the electric machine when the system 100 is operating in an overmodulation region. Overmodulation is used to optimize voltage commands that control the three-phase PWM controlled inverter module 110 to increase inverter output voltage that is provided to the three-phase machine 120. By increasing the inverter output voltage through overmodulation, the maximum available mechanical torque generated by the three-phase machine 120 can be improved/increased, which in turn can improve/increase machine efficiency and improve dynamic performance of three-phase machine. Moreover, this can also increase the modulation index (MI), which allows for the utilization of the battery voltage (Vdc) to be improved. As used herein, "modulation index (MI)," which can be defined as a normalized fundamental reference voltage, is the ratio of the peak fundamental phase voltage (Vr) to the maximum available voltage. The MI can be used to characterize performance of PWM. The MI can be defined via the expression (4):

$$MI = \frac{V_r}{V_{dc}} \cdot \frac{\pi}{2}, \quad (4)$$

where $V_r = \sqrt{V_d^{*2} + V_q^{*2}}$, in which Vd* and Vq* are the d-axis voltage command signal (Vd*) 172 and the q-axis voltage command signal (Vq*) 174 that are output by current controller 170. The range of modulation index is from 0 to 1.

Further detail regarding operation of the overmodulation processor 182 will be described later below with reference to FIGS. 2A AND 2B.

Referring still to FIG. 1A, the αβ-to-abc transformation module 106 receives the stationary reference frame voltage command signals (Vα*, Vβ*) 178, 180 or the modified stationary reference frame α-axis and β-axis voltage command signals (Vα, Vβ) 184, 186, and based on these signals, generates stationary reference frame voltage command signals (Vas* . . . Vcs*) 107 (also referred to as "phase voltage command signals") that are sent to the PWM module 108. The αβ-to-abc transformation is well-known in the art and for sake of brevity will not be described in detail.

The three-phase PWM inverter module 110 is coupled to the PWM module 108. The PWM module 108 is used for the control of pulse width modulation (PWM) of the phase voltage command signals (Vas* . . . Vcs*) 107. The switching vector signals (Sa . . . Sc) 109 are generated based on duty cycle waveforms that are not illustrated in FIG. 1A, but are instead internally generated at the PWM module 108 to have a particular duty cycle during each PWM period. The PWM module 108 modifies the phase voltage command signals (Vas* . . . Vcs*) 107 based on the duty cycle waveforms (not illustrated in FIG. 1A) to generate switching vector signals (Sa . . . Sc) 109, which it provides to the three-phase PWM inverter module 110. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the three-phase AC powered machine 120 at varying speeds based on the DC input 139.

The switching vector signals (Sa . . . Sc) 109 control the switching states of switches in PWM inverter 110 to generate three-phase voltage commands at each phase A, B, C. The switching vector signals (Sa . . . Sc) 109 are PWM waveforms that have a particular duty cycle during each PWM period that is determined by the duty cycle waveforms that are internally generated at the PWM module 108. The three-phase voltage source inverter module 110 must be controlled so that at no time are both switches in the same inverter sub-module 115, 117, 119 (FIG. 1B) or "leg" are turned on to prevent the DC supply from being shorted. As such, the switches in the same inverter sub-module 115, 117, 119 (FIG. 1B) are operated such that when one is off the other is on and vice versa. To explain further, in a given phase (A . . . C) at any particular time, one of the switches is off and the other one of the switches is on (i.e., the two switches in a particular inverter sub-module must have opposite on/off states). As one example with respect to phase A, when switch 182 is on, switch 184 is off, and vice-versa. As such, for a particular inverter sub-module, the on/off status of the two switches in that inverter sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0).

The three-phase PWM inverter module 110 receives the DC input voltage (Vdc) and switching vector signals (Sa . . . Sc) 109, and uses them to generate three-phase alternating current (AC) voltage signal waveforms at inverter poles that drive the three-phase AC machine 120 at varying speeds (ωr) 138.

The three-phase machine 120 receives the three-phase voltage signals generated by the PWM inverter 110 and generates a motor output at the commanded torque Te* 136. In one particular implementation, the machine 120 comprises a three-phase interior permanent-magnet synchronous motor (IPMSM) 120, but the disclosed embodiments can be any multi-phase AC machine having any number of phases.

Although not illustrated in FIG. 1A, the system 100 may also include a gear coupled to and driven by a shaft of the three-phase AC machine 120. The measured feedback stator currents (Ia-Ic) 122-124 are sensed, sampled and provided to the abc-to-αβ transformation module 127 as described above.

An embodiment of the overmodulation preprocessor 182 will now be described with reference to FIG. 2A. The overmodulation preprocessor 182 can reduce variations/errors in the phase voltage applied to the multi-phase machine so that phase current may be properly regulated thus reducing current/torque oscillation, which can in turn improve machine efficiency and performance, as well as utilization of the DC voltage source.

Figure 2A:
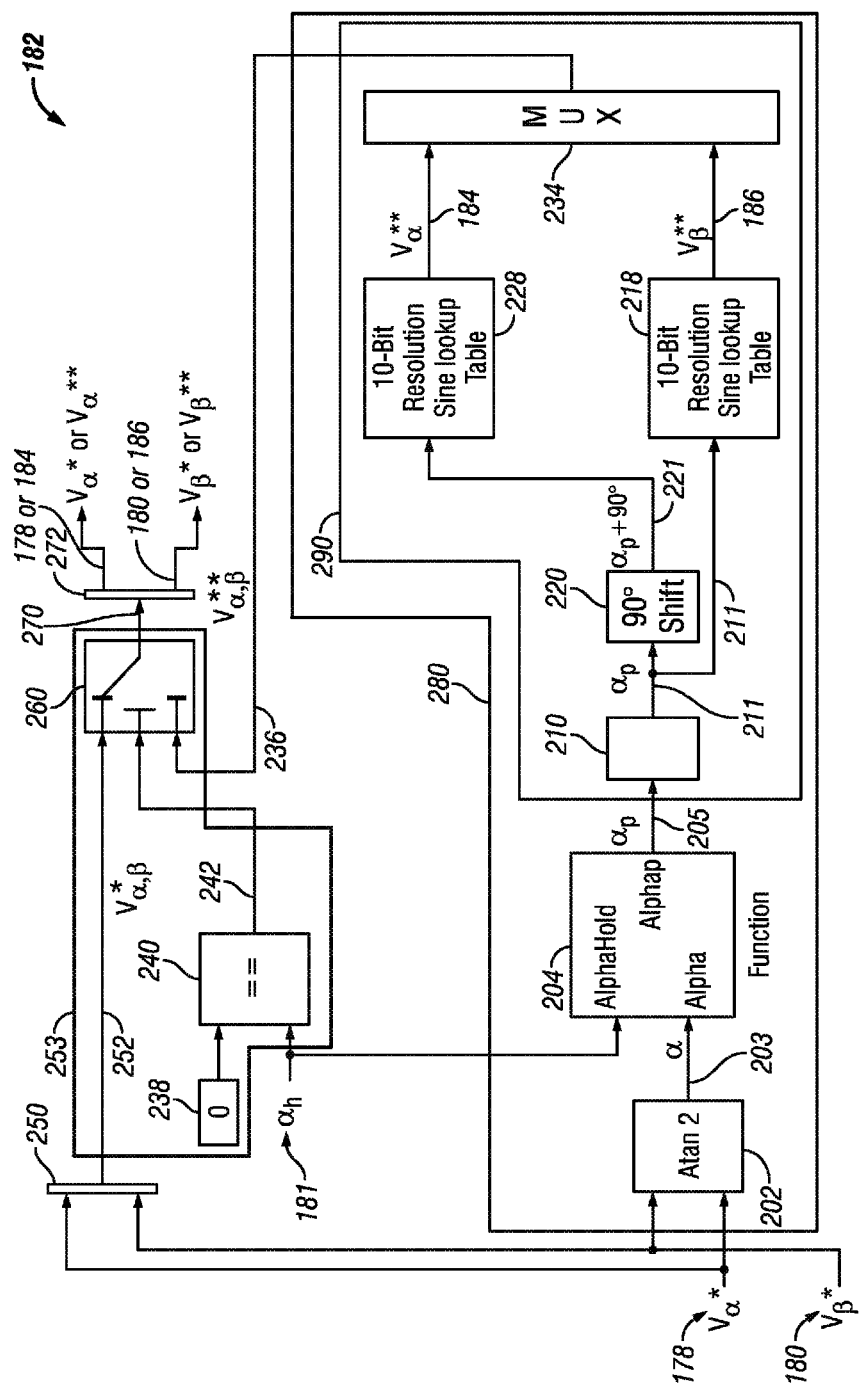
FIG. 2A is a block diagram of one example of an overmodulation processor of the vector controlled motor drive system of FIG. 1A in accordance with some of the disclosed embodiments.

FIG. 2A is a block diagram of one example of an overmodulation processor 182 of the vector controlled motor drive system 100 of FIG. 1 in accordance with some of the disclosed embodiments.

The overmodulation processor 182 includes a first multiplexer 250, a voltage command selection module 253, a demultiplexer module 272 and a voltage command modification module (VCMM) 280.

The voltage command modification module (VCMM) 280 includes a voltage angle computation function 202, a voltage angle modification unit 204, a modified voltage command generation module 290, and a second multiplexer 234.

The voltage angle computation function 202 receives "unmodified" stationary reference frame α-axis and β-axis voltage command signals (Vα*, Vβ*) 178, 180, and computes an arctangent function (per expression (5)) to compute the arctangent of the ratio of the pair of stationary reference frame α-axis and β-axis voltage command signals (Vα*, Vβ*) 178, 180 to generate an actual voltage angle (α) 203.

$$\alpha = \arctan\left(\frac{V_\alpha^*}{V_\beta^*}\right) \quad (5)$$

The actual voltage angle (α) 203 can also be referred to as the angle (α) of the reference voltage vector. The voltage angle modification unit 204 receives the actual voltage angle (α) 203 and the hold angle ($\alpha_h$) 181 and generates a modified voltage angle ($\alpha_p$) 205 based on equation (6) as follows:

$$\alpha_p = \qquad (6)$$
$$\alpha + \frac{\pi}{2n} - \mathrm{mod}\left(\alpha, \frac{\pi}{n}\right) + \frac{\left|\mathrm{mod}\left(\alpha, \frac{\pi}{n}\right) - \alpha_h\right| - \left|\mathrm{mod}\left(\alpha, \frac{\pi}{n}\right) + \alpha_h - \frac{\pi}{n}\right|}{2\left(1 - \frac{2n\alpha_h}{\pi}\right)},\,,$$

where n is the number of phases. The modified voltage angle ($\alpha_p$) 205 can also be referred to as the modified angle (α*) of the reference voltage vector. The hold angle ($\alpha_h$) 181 is a variable command that is a function of modulation index and that ranges between a minimum value of 0 degrees and a maximum number of degrees that is equal to one-half the angular span of a sector. The hold angle ($\alpha_h$) 181 and how it is generated is well-known in the art, and for sake of brevity will not be described in detail herein. One example is described in J. Holtz, Lotzkat and Ashwin M. Khambadkone, "On continuous control of PWM inverter in the overmodulation range including the six step mode," IEEE Transactions on Power Electronics, vol. 8, pp. 546-553, 1993, which is incorporated herein by reference it its entirety.

In accordance with the disclosed embodiments, the voltage angle modification unit 204 can generate a modified voltage angle ($\alpha_p$) 205 based on the hold angle ($\alpha_h$) 181 and the actual voltage angle (α) 203 without having to compute a sector number of the pair of unmodified voltage command signals (Vα*, Vβ*) 178, 180.

The modified voltage command generation module 290 can generate, based on the modified voltage angle ($\alpha_p$) 205, a pair of modified voltage command signals (Vα, Vβ) 184, 186. The modified voltage command signals (Vα, Vβ) 184, 186 can be used to generate phase voltage command signals for controlling the multi-phase electric machine 120 when the multi-phase electric machine 120 is operating in an overmodulation region.

In one exemplary implementation, illustrated in FIG. 2A, the modified voltage command generation module 290 includes an index signal generation module 210, a first 10-bit resolution sine lookup table (LUT) 218, a phase shift module 220, and a second 10-bit resolution sine lookup table (LUT) 228.

The index signal generation module 210 processes the modified voltage angle ($\alpha_p$) to generate an indexing signal 211 that corresponds to the modified voltage angle ($\alpha_p$) 211.

Figure 2B:
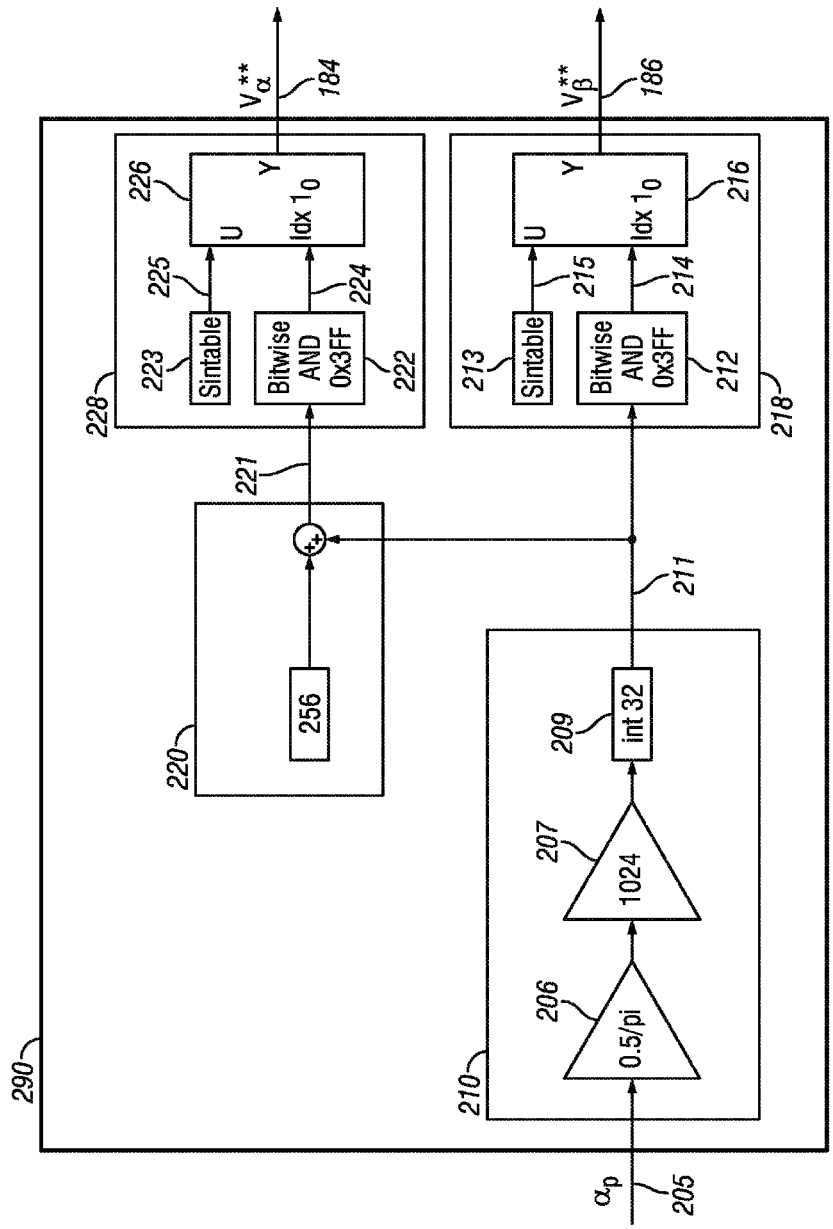
FIG. 2B is a block diagram of one exemplary implementation of a modified voltage command generation module in accordance with some of the disclosed embodiments.

FIG. 2B is a block diagram of one exemplary implementation of the modified voltage command generation module 290 in accordance with some of the disclosed embodiments.

In one exemplary implementation that is illustrated in FIG. 2B, the index signal generation module 210 includes a gain module 206, an indexing module 207, and an integer conversion module 209. The gain module 206 is a gain block that receives the modified voltage angle ($\alpha_p$) 205 (in radians) and multiplies it by a constant (1/2π) to generate a scaled-version of the modified voltage angle ($\alpha_p$). The indexing module 207 receives the scaled-version of the modified voltage angle ($\alpha_p$) and generates converts it to an indexed signal of 1024 bits, and the integer conversion module 209 receives the indexed signal and converts it into a 32-bit integer value indexing signal 211 that corresponds to the modified voltage angle ($\alpha_p$) 211.

The phase shift module 220 applies a ninety-degree phase shift to the indexing signal 211 by shifting it 256 bits to generate a phase-shifted version of the indexing signal 221. In one exemplary implementation that is illustrated in FIG. 2B, the phase shift module 220 can be implemented using a 256-bit shift module and a summer module. The summer module receives the 32-bit integer value indexing signal 211 and sums it with 256 bits to generate a phase-shifted version of the indexing signal 221. The phase-shifted version of the indexing signal 221 is identical to the indexing signal 211 except that it is shifted by 90 degrees.

The first 10-bit resolution sine lookup table (LUT) 218 generates the modified voltage command signal (Vβ) 186 based on the indexing signal 211. In one exemplary implementation that is illustrated in FIG. 2B, the first 10-bit resolution sine lookup table (LUT) 218 can be implemented using a first bitwise AND operator module 212, a first sinetable 213, and a modified β-axis voltage command lookup table 216. The first bitwise AND operator module 212 receives the indexing signal 211 and masks off bits so that it does not exceed the range of the modified β-axis voltage command lookup table 216. The first sinetable 213 generates a 1024-bit sinewave signal 215. The modified β-axis voltage command lookup table 216 receives the output 214 of the first bitwise AND operator module 212 and the 1024-bit sinewave signal 215 and generates a modified stationary reference frame β-axis voltage command signal 186**.

The second 10-bit resolution sine lookup table (LUT) 228 generates the modified voltage command signals (Vα**) 184 based on the phase-shifted version of the indexing signal 221. In one exemplary implementation that is illustrated in FIG. 2B, the second 10-bit resolution sine lookup table (LUT) 228 can be implemented using a second bitwise AND operator module 222, a second sinetable 223, and a modified α-axis voltage command lookup table 226. The second bitwise AND operator module 222 receives the phase-shifted version of the indexing signal 221 and masks off bits so that it does not exceed the range of the modified α-axis voltage command lookup table 226. The second sinetable 223 generates a 1024-bit sinewave signal 225. The modified α-axis voltage command lookup table 226 receives the output 224 of the second bitwise AND operator module 222 and the 1024-bit sinewave signal 225 and generates a modified stationary reference frame α-axis voltage command signal 184.

The second multiplexer 234 (FIG. 2A) multiplexes the modified stationary reference frame α-axis and β-axis voltage command signals (Vα, Vβ) 184, 186 to generate a modified stationary reference frame voltage command signal 236 that includes both of the modified α-axis and β-axis voltage command signals.

Referring again to FIG. 2A, the first multiplexer 250 receives the stationary reference frame α-axis and β-axis voltage command signals (Vα*, Vβ*) 178, 180, and multiplexes them to generates an unmodified stationary reference frame voltage command signal 252 that includes both of the unmodified α-axis and β-axis voltage command signals.

Depending on the value of the hold angle ($α_h$) 181, the voltage command selection module 253 can output either the unmodified voltage command signals (Vα*, Vβ*) 178, 180, or the modified voltage command signals (Vα, Vβ) 184, 186. In one implementation, the selection module voltage command selection module 253 includes a zero input 238, a comparator 240, and a selector module 260.

The comparator 240 compares the hold angle ($α_h$) 181 to the zero input 238 (to essentially determine whether the system is operating in a linear region or in an overmodulation region), and generates an appropriate selection signal 242 (e.g., 0 or 1) based on the comparison. To explain further, when the hold angle ($α_h$) 181 is equal to zero (i.e., when operating in the linear region), the comparator 240 will generate a selection signal 242 having a logical one (1) value. By contrast, when the hold angle ($α_h$) 181 is greater than zero (i.e., when operating in an overmodulation region), the comparator 240 will generate a selection signal 242 having a logical zero (0) value.

The selector module 260 receives the unmodified stationary reference frame voltage command signal 252 and the modified stationary reference frame voltage command signal 236. Based on the selection signal 242, the selector module 260 outputs either the unmodified stationary reference frame voltage command signal 252 or the modified stationary reference frame voltage command signal 236 as an output stationary reference frame voltage command signal 270.

For example, in one embodiment, when the hold angle ($α_h$) 181 is equal to zero the comparator 240 determines that the system is operating in the linear region, and will generate a selection signal 242 having a logical one (1) value, which will cause the selector module 260 to select and output the unmodified stationary reference frame voltage command signal 252 as the output stationary reference frame voltage command signal 270.

By contrast, when the hold angle ($α_h$) 181 is greater than zero (i.e., when operating in an overmodulation region), the comparator 240 will generate a selection signal 242 having a logical zero (0) value, which causes the selector module 260 to select and output the modified stationary reference frame voltage command signal 236 as the output stationary reference frame voltage command signal 270.

The demultiplexer module 272 demultiplexes the output voltage command signal 270 to generate either the stationary reference frame α-axis and β-axis voltage command signals (Vα*, Vβ*) 178, 180, or modified stationary reference frame α-axis and β-axis voltage command signals (Vα, Vβ) 184, 186 that are output to the αβ-to-abc transformation module 106.

Figure 3:
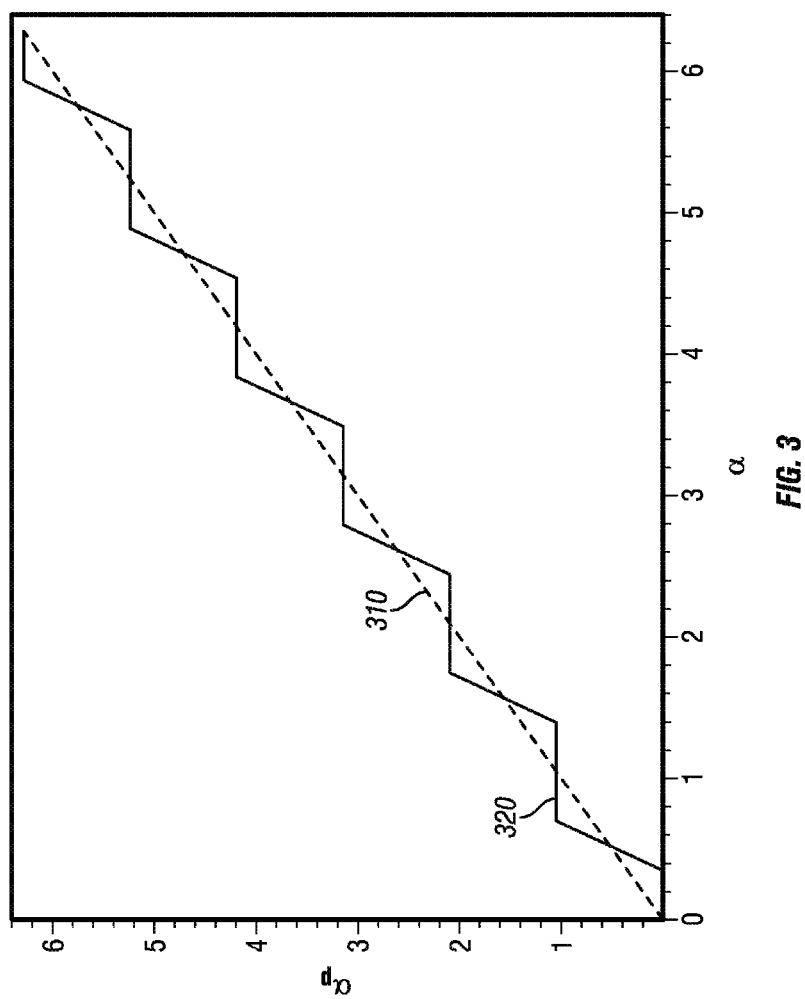
FIG. 3 are two plots that show the relationship between an actual voltage angle ($\alpha$) and a modified voltage angle ($\alpha_p$) in accordance with some of the disclosed embodiments.

FIG. 3 are two plots 310 and 320 that show the relationship between an actual voltage angle (α) and a modified voltage angle ($α_p$) in accordance with some of the disclosed embodiments. Plot 310 illustrates that when the system 100 is operating in the linear region (without modification) the actual voltage angle (α) increases linearly as sector number (along the X-axis) increases from 0 to 6. This would correspond to an operating scenario when operating in a linear region (and when overmodulation is not applied), and the overmodulation processor 182 passes the stationary reference frame α-axis and β-axis voltage command signals (Vα*, Vβ*) 178, 180 to the αβ-to-abc transformation module 106 without modifying them or the actual voltage angle (α).

By contrast, plot 320 illustrates that when the system 100 is operating in the overmodulation region (with modification) the modified voltage angle ($α_p$) increases in a non-linear or step-wise manner over certain operating points of each sector as sector number (along the X-axis) increases from 0 to 6. The change is dependent on the hold angle ($α_h$) 181. This would correspond to an operating scenario when the system 100 is operating in an overmodulation region, and the overmodulation processor 182 further processes the voltage command signals 178, 180 to modify the actual voltage angle (α) and generate the modified stationary reference frame α-axis and β-axis voltage command signals (Vα, Vβ) 184, 186 that are optimized such that output voltage signals generated by the inverter module 110 can be increased via overmodulation.

Figure 4:
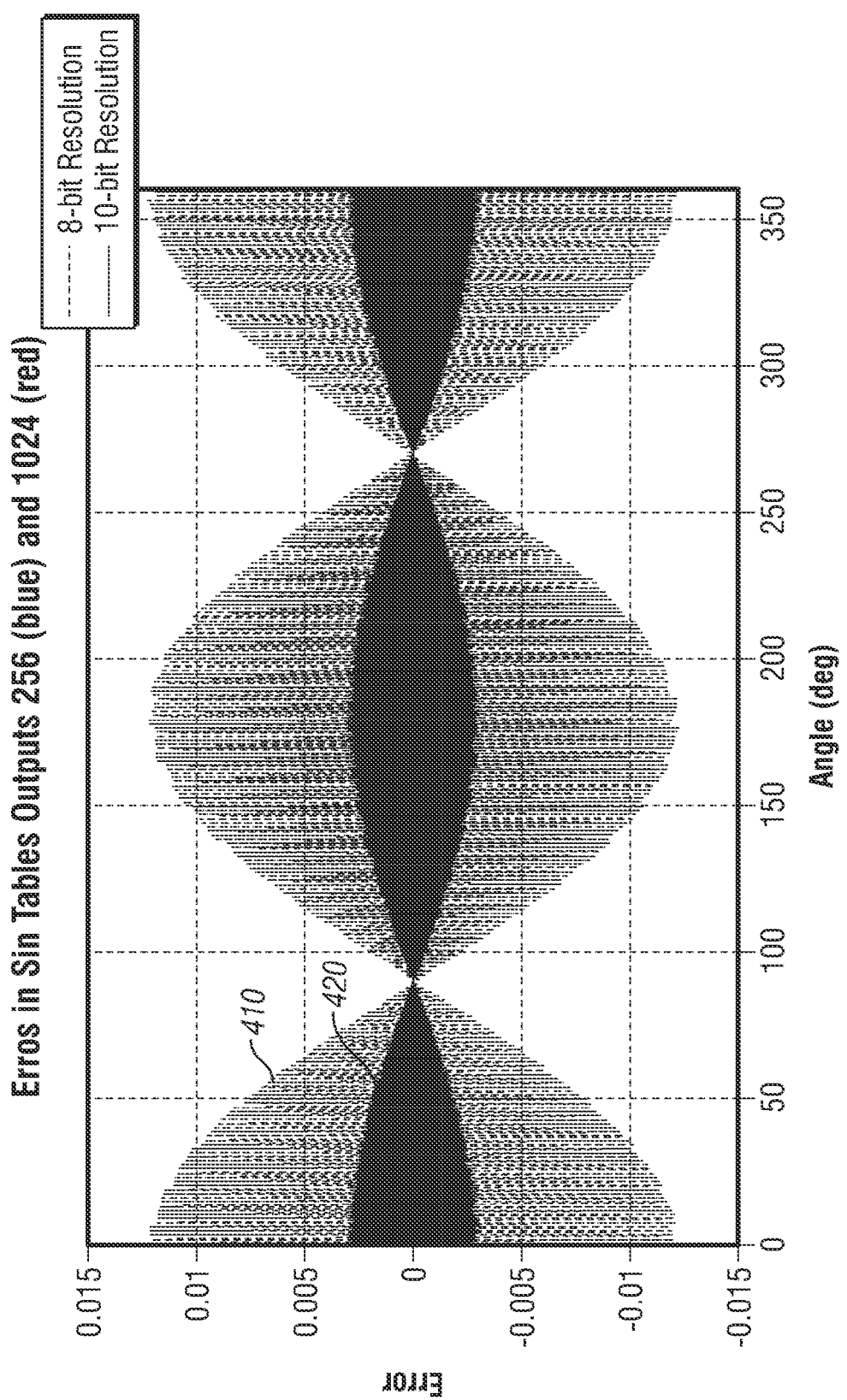
FIG. 4 are two plots that show error in the output of sine tables as a function of angle (in degrees) when the resolution of the sine tables changes from 8-bit resolution to 10-bit resolution in accordance with some of the disclosed embodiments.

FIG. 4 are two plots 410, 420 that show error in the output of sine tables 214, 224 as a function of angle (in degrees) when the resolution of the sine tables 214, 224 changes from 8-bit resolution to 10-bit resolution in accordance with some of the disclosed embodiments. This illustrates that the error of the sine tables 214, 224 improves significantly as resolution in increased from 8-bits (plot 410) to 10-bits (plot 420).

Figure 5:
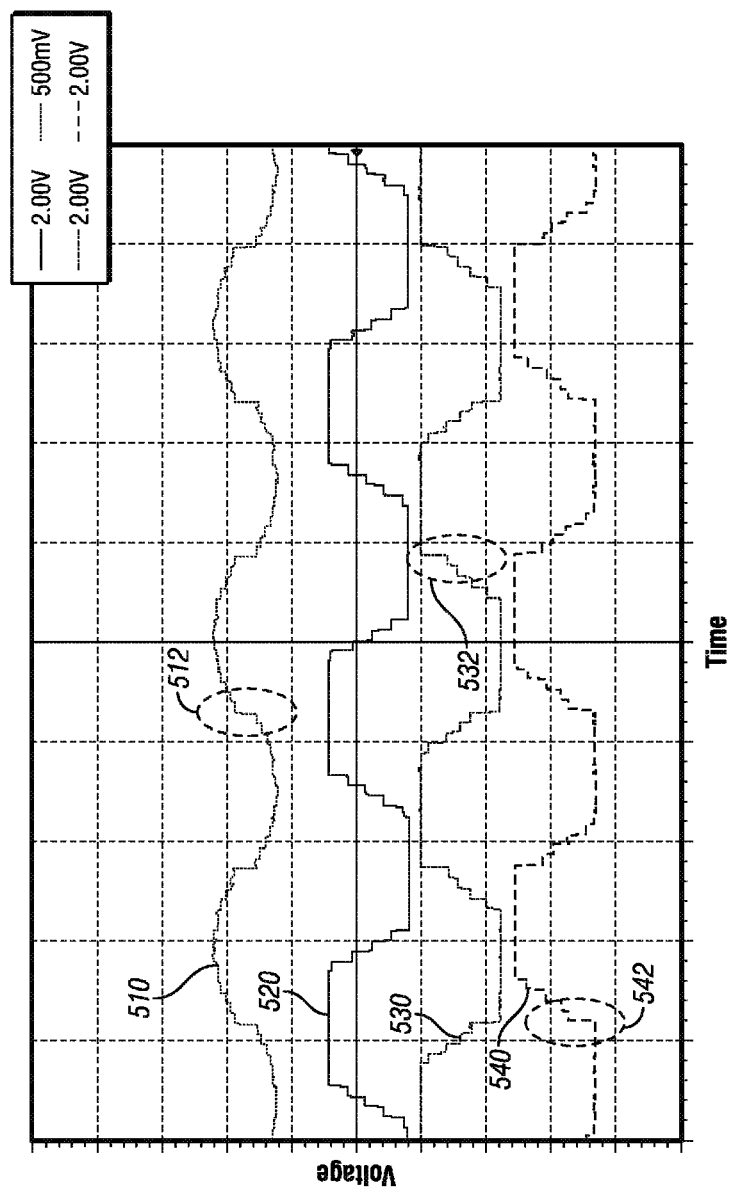
FIG. 5 shows a graph of a stationary reference frame β-axis voltage command signal (Vβ*) as a function of time that was generated using a conventional approach (and the resulting impact on duty cycle signals.

FIG. 5 shows a graph 510 of the β-axis voltage command signal (Vβ*) 178 as a function of time that was generated using a conventional approach (when the disclosed embodiments are not applied) and the resulting impact on duty cycle signals 520, 530, 540 generated by the PWM inverter module. Graph 510 shows the β-axis voltage command signal (Vβ*) 178 as a function of time when operating in an overmodulation region, where portion 512 is circled to highlight a discontinuity due to poor resolution of the sine tables. The β-axis voltage command signal (Vβ*) 178 is eventually used at the PWM inverter module to generate the duty cycle signals 520, 530, 540. Graph 520 shows a duty cycle signal 520 for phase A as a function of time. Graph 530 shows a duty cycle signal 530 for phase A as a function of time, where portion 532 is circled to highlight a glitch (or "disturbance") in the signal 530 that causes asymmetry between the rising and falling edges of signal 530. Similarly, graph 540 shows a duty cycle signal 540 for phase C as a function of time, where portion 542 is circled to highlight a glitch in the signal 540 that causes asymmetry between the rising and falling edges of signal 540. The glitches in 532, 542 and asymmetry of the signals 530, 540 cause the wrong phase voltages to be applied at motor phases B and C, which in turn causes the current regulator to attempt to compensate for the glitches in the phase voltages. Among other things, this results in inefficient use of the voltage that is available to drive the machine.

Figure 6:
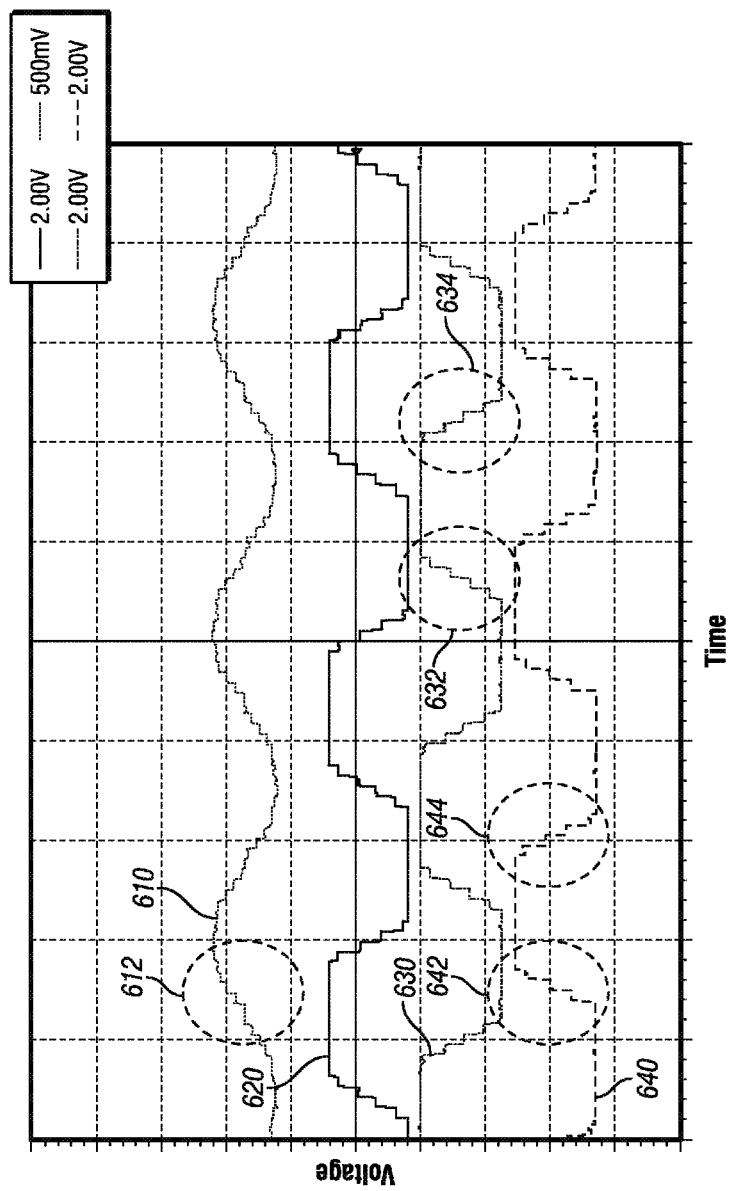
FIG. 6 shows a graph of a modified stationary reference frame β-axis voltage command signal (Vβ**) as a function of time that was generated when the disclosed embodiments are applied and the resulting impact on duty cycle signals.

FIG. 6 shows a graph 610 of the modified stationary reference frame β-axis voltage command signal (Vβ) 186 as a function of time that was generated when the disclosed embodiments are applied and the resulting impact on duty cycle signals 620, 630, 640 generated by the PWM inverter module. Graph 610 shows the modified stationary reference frame β-axis voltage command signal (Vβ) 186 as a function of time when operating in an overmodulation region, where portion 612 is circled to highlight the discontinuities of FIG. 5 have been reduced and/or eliminated. The inventors anticipate that is due to increased resolution of the sine tables. The modified stationary reference frame β-axis voltage command signal (Vβ**) 186 is eventually used at the PWM inverter module to generate the duty cycle signals 620, 630, 640. Graph 620 shows a duty cycle signal 620 for phase A as a function of time. Graph 630 shows a duty cycle signal 630 for phase A as a function of time, where portion 632 is circled to highlight glitches in the signal 630 have been reduced and/or eliminated and the signal 630 is less distorted. Similarly, graph 640 shows a duty cycle signal 640 for phase C as a function of time, where portion 642 is circled to highlight glitches in the signal 640 have been reduced and/or eliminated and the signal 640 is less distorted. As a result, symmetry between the rising and falling edges of signal 630 (inside circles 632, 634) and the rising and falling edges of signal 640 (inside circles 642, 644) is improved. As a result, errors in the phase voltages applied at motor phases B and C can be reduced and more accurate phase voltages can be applied. This improves operation and performance of the current regulator (because its not attempting to compensate for the glitches or disturbances in the phase voltages) and thereby results in more inefficient use of the voltage that is available to drive the machine.

Figure 7:
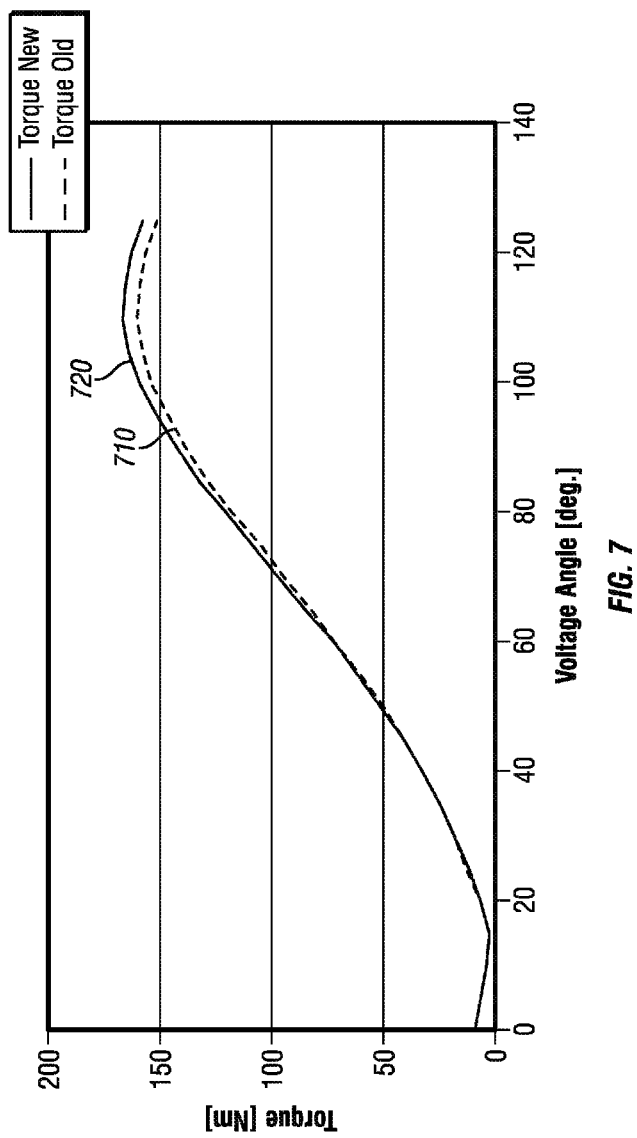
FIG. 7 shows two graphs that plot output torque in as a function of voltage angle.

FIG. 7 shows two graphs 710, 720 that plot output torque (in Newton-meters) as a function of voltage angle (in degrees). Graph 710 shows output torque (in Newton-meters) as a function of voltage angle (degrees) for a conventional system. Graph 720 shows output torque (in Newton-meters) as a function of voltage angle (in degrees) for a system 100 when the disclosed overmodulation processor 182 is implemented in accordance with some of the disclosed embodiments. Graph 720 illustrates that output torque improves when the disclosed overmodulation processor 182 is implemented particularly as the voltage angle increases.

Figure 8:
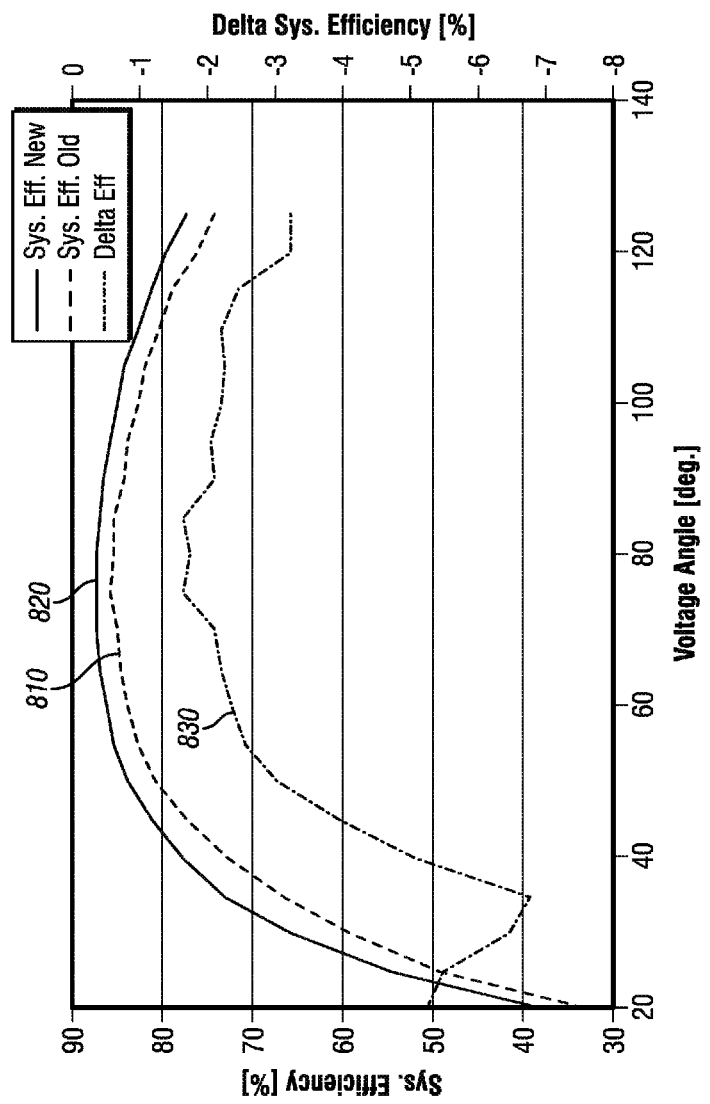
FIG. 8 shows two graphs that plot system efficiency (%) as a function of voltage angle (degrees).

FIG. 8 shows two graphs 810, 820 that plot system efficiency (%) as a function of voltage angle (degrees). Graph 810 shows system efficiency (%) as a function of voltage angle (in degrees) for a conventional system. Graph 820 shows system efficiency (%) as a function of voltage angle (degrees) for a system 100 when the disclosed overmodulation processor 182 is implemented in accordance with some of the disclosed embodiments. Graph 830 shows the difference in efficiency between graphs 820 and 830 and illustrates that system efficiency improves when the disclosed overmodulation processor 182 is implemented since a greater percentage of the available voltage is used. In addition, torque and mechanical power are also improved.

Thus, various embodiments have been described for controlling operation of a multi-phase machine in a vector controlled motor drive system when the multi-phase machine operates in an overmodulation region. The disclosed embodiments provide improved methods, systems and apparatus for generating modified voltage command signals that are used when the system operates in an overmodulation region. In accordance with the disclosed embodiments, function calls are used to compute an actual voltage angle of the voltage command signals instead of look-up tables. In addition, existing low resolution trigonometric lookup tables are replaced with higher resolution lookup tables, which allows for further improvement of the trigonometric calculations that are used to calculate the voltage command signals. The disclosed embodiments can improve calculation of the variables in the second over-modulation region, as well as enhance the throughput. The disclosed embodiments can reduce variations/errors in the phase voltage applied to the multi-phase machine and produce more accurate machine phase voltages, which can help increase power and increase machine efficiency and improve utilization of the DC voltage source. By providing more accurate phase voltages phase current may be properly regulated thus reducing current/torque oscillation. The disclosed embodiments can improve existing current traction systems by significantly improving the accuracy of duty cycle calculation (due to more accurate calculation of the correct stationary reference frame α-axis and β-axis voltage command signals (Vα*, Vβ*) 178, 180), and quality of current regulation by increasing current regulation robustness when operating in an overmodulation II region. The disclosed embodiments can also extend the voltage range over which the inverter may safely enter over-modulation and six-step mode in the field-weakening region Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An overmodulation method performed by an overmodulation processor for controlling an electric machine that is operating in an overmodulation region, the method comprising:
    receiving unmodified voltage command signals at the overmodulation processor;
    generating, at the overmodulation processor based on a hold angle, a modified voltage angle without computing a sector number of the unmodified voltage command signals; and
    generating, at the overmodulation processor based on the modified voltage angle, modified voltage command signals when the electric machine is operating in the overmodulation region.

2. A method according to claim 1, wherein the step of generating a modified voltage angle, comprises:
    generating a modified voltage angle based on the hold angle and an actual voltage angle of the unmodified voltage command signals without computing a sector number of the unmodified voltage command signals.

3. A method according to claim 2, further comprising:
    generating an actual voltage angle by computing an arctangent of the ratio of the unmodified voltage command signals.

4. A method according to claim 3, wherein the step of generating the modified voltage angle, comprises:
    computing an equation:

$$\alpha_p = \alpha + \frac{\pi}{2n} - \text{mod}\left(\alpha, \frac{\pi}{n}\right) + \frac{\left|\text{mod}\left(\alpha, \frac{\pi}{n}\right) - \alpha_h\right| - \left|\text{mod}\left(\alpha, \frac{\pi}{n}\right) + \alpha_h - \frac{\pi}{n}\right|}{2\left(1 - \frac{2n\alpha_h}{\pi}\right)},$$

wherein $\alpha_p$ is the modified voltage angle, wherein $\alpha_h$ is the hold angle, wherein $\alpha$ is the actual voltage angle of the unmodified voltage command signals, and wherein n is a number of phases of the electric machine.

5. A method according to claim 1, further comprising:
    generating either a first selection signal or a second selection signal to select either the unmodified voltage command signals, or the modified voltage command signals; and
    outputting the unmodified voltage command signals in response to the first selection signal that is generated when the hold angle has a value other than zero and the electric machine is operating in the linear region; or
    outputting modified voltage command signals in response to the second selection signal that is generated when the hold angle has a value of zero and the electric machine is operating in the overmodulation region.

6. A method according to claim 1, wherein the voltage command signals comprise:
    stationary reference frame $\alpha$-axis and $\beta$-axis voltage command signals, and
    wherein the modified voltage command signals comprise:
    modified stationary reference frame $\alpha$-axis and $\beta$-axis voltage command signals.

7. An overmodulation processor configured to generate modified voltage command signals for controlling an electric machine when the electric machine is operating in an overmodulation region, the overmodulation processor comprising:
    a voltage angle computation function module configured to receive a pair of unmodified voltage command signals and to compute an arctangent of a ratio of the pair of unmodified voltage command signals to generate to generate an actual voltage angle;
    a voltage angle modification unit configured to generate a modified voltage angle based on a hold angle and the actual voltage angle without computing a sector number of the pair of unmodified voltage command signals; and a modified voltage command generation module configured to generate, based on the modified voltage angle, a pair of modified voltage command signals.

8. An overmodulation processor according to claim 7, wherein the voltage angle modification unit is configured to compute an equation:

$$\alpha_p = \alpha + \frac{\pi}{2n} - \mathrm{mod}\!\left(\alpha, \frac{\pi}{n}\right) + \frac{\left|\mathrm{mod}\!\left(\alpha, \frac{\pi}{n}\right) - \alpha_h\right| - \left|\mathrm{mod}\!\left(\alpha, \frac{\pi}{n}\right) + \alpha_h - \frac{\pi}{n}\right|}{2\!\left(1 - \frac{2n\alpha_h}{\pi}\right)},$$

to generate the modified voltage angle, wherein $\alpha_p$ is the modified voltage angle, wherein $\alpha_h$ is the hold angle, wherein $\alpha$ is the actual voltage angle of the pair of unmodified voltage command signals, and wherein n is a number of phases of the electric machine.

9. An overmodulation processor according to claim 7, wherein the pair of modified voltage command signals are generated when the hold angle has a value of zero which indicates that the electric machine is operating in the overmodulation region.

10. An overmodulation processor according to claim 7, wherein the pair of modified voltage command signals comprise:
modified stationary reference frame α-axis and β-axis voltage command signals.

11. A vector controlled motor drive system for controlling an electric machine, comprising:
an overmodulation processor configured to receive unmodified voltage command signals and a hold angle, to generate a modified voltage angle without computing a sector number of the unmodified voltage command signals, and to generate modified voltage command signals, based on the modified voltage angle; and
a voltage command selection module configured to select, depending on the value of the hold angle, either the unmodified voltage command signals or the modified voltage command signals, and to output, based on the selection, either the unmodified voltage command signals or the modified voltage command signals.

12. A system according to claim 11, wherein the modified voltage angle is generated based on and the hold angle and an actual voltage angle of the unmodified voltage command signals without computing a sector number of the unmodified voltage command signals.

13. A system according to claim 12, wherein the overmodulation processor comprises:
a voltage command modification module (VCMM), comprising:
a voltage angle computation function configured to compute an arctangent of the ratio of the unmodified voltage command signals to generate an actual voltage angle; and
a voltage angle modification unit configured to generate a modified voltage angle based on the actual voltage angle and the hold angle.

14. A system according to claim 13, wherein the voltage angle modification unit is configured to generate the modified voltage angle based on and the hold angle and an actual voltage angle by computing an equation:

$$\alpha_p = \alpha + \frac{\pi}{2n} - \mathrm{mod}\!\left(\alpha, \frac{\pi}{n}\right) + \frac{\left|\mathrm{mod}\!\left(\alpha, \frac{\pi}{n}\right) - \alpha_h\right| - \left|\mathrm{mod}\!\left(\alpha, \frac{\pi}{n}\right) + \alpha_h - \frac{\pi}{n}\right|}{2\!\left(1 - \frac{2n\alpha_h}{\pi}\right)},$$

wherein $\alpha_p$ is the modified voltage angle, wherein $\alpha_h$ is the hold angle, wherein $\alpha$ is the actual voltage angle of the unmodified voltage command signals, and wherein n is a number of phases of the electric machine.

15. A system according to claim 14, wherein the modified voltage command signals comprise: a modified a-axis voltage command signals and a modified β-axis voltage command signal, and wherein the voltage command modification module (VCMM) of the overmodulation processor, further comprises:
a modified voltage command generation module, comprising:
a index signal generation module configured to process the modified voltage angle to generate an indexing signal that corresponds to the modified voltage angle;
a phase shift module configured to apply an ninety-degree phase shift to the indexing signal to generate a phase-shifted version of the indexing signal;
a first 10-bit resolution sine lookup table (LUT) configured to generate one of the modified voltage command signal based on the indexing signal; and
a second 10-bit resolution sine lookup table (LUT) configured to generate another one of the modified voltage command signals based on the phase-shifted version of the indexing signal.

16. A system according to claim 12, wherein the voltage command signals comprise:
stationary reference frame α-axis and β-axis voltage command signals, and
wherein the modified voltage command signals comprise:
modified stationary reference frame α-axis and β-axis voltage command signals.

17. A system according to claim 11, wherein the voltage command selection module configured to select, depending on the value of the hold angle, either the unmodified voltage command signals, or the modified voltage command signals, and, based on the selection, configured to output either:
the unmodified voltage command signals when the hold angle has a value other than zero and the system is operating in a linear region, or
the modified voltage command signals when the hold angle has a value of zero and the system is operating in the overmodulation region.

* * * * *